M. J. HEALY.
RING SHIELD AND FENDER RING FOR GLASS DRAWING APPARATUS.
APPLICATION FILED NOV. 10, 1911.
1,034,447.
Patented Aug. 6, 1912.
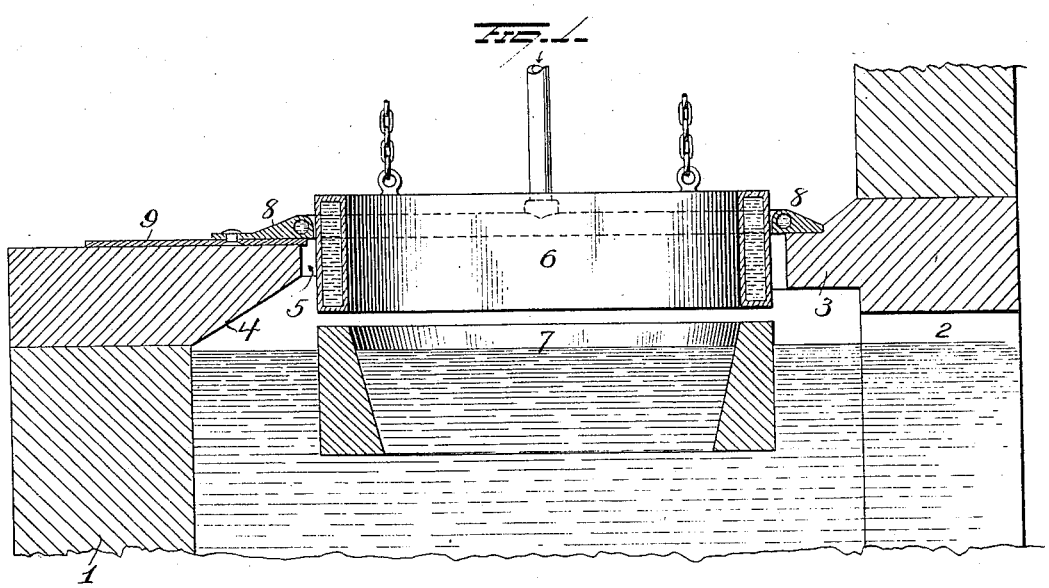
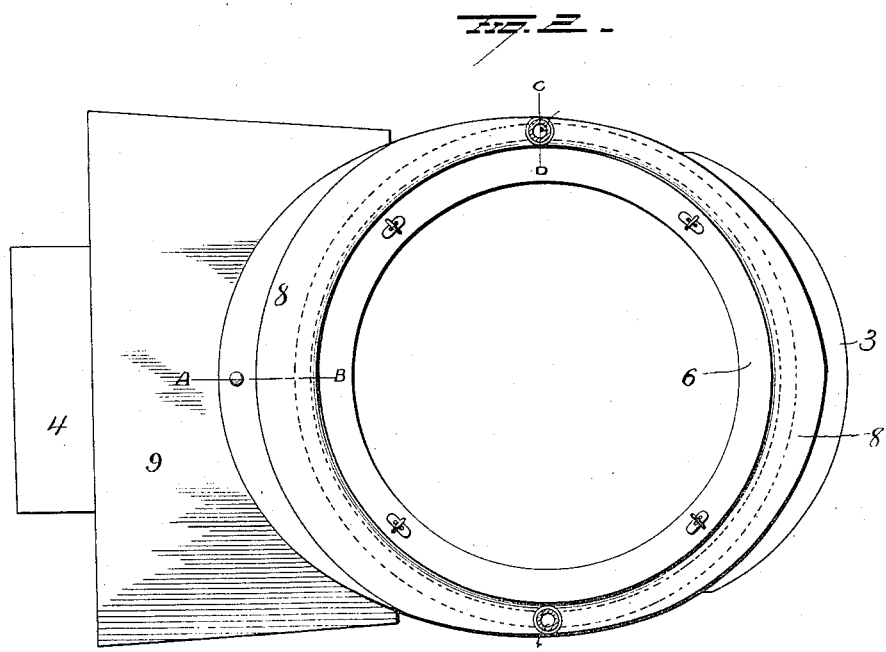

UNITED STATES PATENT OFFICE.

MACK J. HEALY, OF BRADFORD, PENNSYLVANIA.

RING-SHIELD AND FENDER-RING FOR GLASS-DRAWING APPARATUS.

1,034,447.  Specification of Letters Patent.  Patented Aug. 6, 1912.

Application filed November 10, 1911. Serial No. 659,603.

*To all whom it may concern:*

Be it known that I, MACK J. HEALY, a citizen of the United States, residing at Bradford, in the county of McKean and State of Pennsylvania, have invented certain new and useful Improvements in Ring-Shields and Fender-Rings for Glass-Drawing Apparatus; and I do hereby declare the following to be a full, clear, and exact description of the invention, such as will enable others skilled in the art to which it appertains to make and use the same.

My invention relates to an improvement in ring shields and fender shield plate for glass drawing apparatus, the object being to provide means for preventing contact between the ring shield and the top stone having the drawing opening therein, and for closing the opening between said shield and stone, and it consists in a water cooled fender shield plate carried on the top stone and forming a guide and fender for the ring shield.

In the accompanying drawings, Figure 1 is a view in section through a portion of a glass melting tank, showing my improvement in place, Fig. 2 is a plan view of the fender shield plate and a portion of the top stone and pier crown of the furnace on which the fender plate rests, Fig. 3 is a view in section on the line A—B and Fig. 4 is a similar view on the line C—D of Fig. 2.

1 represents the breast wall and 2 a pier of a glass melting furnace. Located on the pier 2 is the pier crown 3, and seated on the breast wall 1 is the top stone 4. This top stone is preferably made in sections only one of which is shown in Fig. 2, and they together with the pier crown 3 and side shades are shaped to form the drawing opening 5 through which the cylinders are drawn from the molten glass in the tank.

6 is the ring shield, preferably made of metal, and hollow, so that it may be water cooled. This shield 6 is supported so as to be raised and lowered, and when in operation its lower end is but slightly above the upper end of the floating ring 7. The ring shield 6 is of less external diameter than the drawing opening 5, and the space between the ring shield and the wall of the drawing opening, is closed by the fender plate 8. This fender plate 8 is of greater external diameter than the drawing opening in the top stone of the tank, so as to rest on the top stone and pier crown and be supported thereon, and is of lesser internal diameter than the drawing opening, so as to overhang the latter and approximately close the space between the walls of the said opening and the ring shield as shown in Fig. 1. It is flat on its underside so as to rest solidly on the cap stone and other parts of the tanks which support the same, and as shown in Figs. 3 and 4 is narrower at the sides than at the front and rear, and is wider, and consequently heavier at the front than at the rear, and may be attached at its front to a sheet iron plate 9 covering a portion of the top stone. While I prefer to use the plate 9, it is not necessary to attach the fender plate to it, as the latter is sufficiently heavy to maintain its position without the assistance of the plate 9.

As shown in Fig. 2, the water space 10 in the fender plate 8 is concentric with and close to the inner wall of the plate so that the portion of the plate over the drawing opening and adjacent the ring shield will be cooled by the circulation of the water therein by water admitted and discharged through the pipes 11 and 12 respectively.

One of the principal objects of the fender plate 8 is to practically close the drawing opening to the outside of the ring shield, so as to prevent dirt or broken glass from falling back into the tank, and to prevent the ring shield coming in contact with any clay or refractory material.

When clay or other refractory top ring is used, it is necessary to leave sufficient space between the ring and the walls of the drawing opening in the top stone, for the free movement of the top ring or ring shield. When a cylinder breaks in the process of drawing, the glass falls onto the top stone against the outer side of the ring shield and gradually melts and becomes vitrified, and drips or scales off and falls into the tank around the ring shield. This vitrified glass will not remelt and when drawn into a cylinder results in breakage or poor glass. With a metal ring shield some of these conditions are met with. While the glass will not adhere to the metal ring, it is still necessary to leave sufficient space between the ring shield and walls of the drawing opening for the free movement of the metal shield. Particles of glass are, of course, free to fall through this space, if left open, and in the raising and lowering of the metal shield ring, the latter coming in contact with the clay top stones, chips off particles which drop into the molten glass.

By the use of the water cooled fender plate, I make a practically tight joint between the ring shield and top stone, and prevent any contact between the ring shield and said stone. This fender plate is also advantageous in that it closes the drawing opening around the ring shield and holds the heat within the tank and keeps the glass at a more even temperature, and prevents exposure of the glass in the tank to the action of the air, except of course immediately within and under the ring shield which is necessary and desirable.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. The combination of a top stone of a glass melting tank, a ring shield, and a fender plate embracing the ring shield and overhanging the drawing opening in the top stone, and resting on and wholly above said top stone.

2. The combination of a top stone having a drawing opening therein, a ring shield, and a water cooled fender plate embracing the ring shield and resting wholly above and on the top stone and overhanging the drawing opening in the latter.

3. The combination of a top stone having a drawing opening therein, a movable water cooled metal ring shield, and a fender plate embracing the ring shield and resting on the top stone and overhanging the drawing opening in the top stone.

4. The combination of a top stone having a drawing opening therein, a water cooled metal ring shield, and a water cooled fender plate embracing the ring shield and resting on the top stone and overhanging said drawing opening in the latter.

5. The combination of a top stone having a drawing opening therein, a ring shield, a water cooled fender plate resting on the top stone and overhanging the drawing opening in the latter and embracing the ring shield, and water supply and waste pipes connected with said fender plate.

6. The combination of a glass melting tank having a drawing opening in the top stone thereof, a shield of less diameter than said drawing opening, and a fender plate overhanging said drawing opening and embracing said shield, the said fender plate resting on and wholly above the top stone of the tank and closing the space between the walls of the drawing opening and the ring shield.

7. The combination with a glass melting tank having a drawing opening, of a ring shield of less diameter than said drawing opening, and a water cooled fender plate flat on its underside and embracing said shield and resting on the top of the tank and closing the space between the walls of the drawing opening and the ring shield.

8. The combination with a glass melting tank having a drawing opening, of a ring shield of less diameter than said drawing opening, a fender plate resting on and wholly above the top stone and pier crown of the tank and embracing the ring shield, the said fender plate closing the space between the ring shield and the walls of the drawing opening.

In testimony whereof, I have signed this specification in the presence of two subscribing witnesses.

MACK J. HEALY.

Witnesses:
WILLIAM C. PURPLE,
T. P. GEOGHEGAN.